(12) United States Patent
Al-Shammari

(10) Patent No.: US 8,789,597 B2
(45) Date of Patent: Jul. 29, 2014

(54) WATER SELF-SHUTOFF TUBULAR

(75) Inventor: Mohammad M. Al-Shammari, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 380 days.

(21) Appl. No.: 13/192,090

(22) Filed: Jul. 27, 2011

(65) Prior Publication Data

US 2013/0025687 A1      Jan. 31, 2013

(51) Int. Cl.
E21B 33/13       (2006.01)

(52) U.S. Cl.
USPC .................. 166/292; 166/228; 166/236

(58) Field of Classification Search
USPC ........... 166/292, 300, 205, 228, 236; 138/140
See application file for complete search history.

(56) References Cited

U.S. PATENT DOCUMENTS

| | | | |
|---|---|---|---|
| 2,213,038 A | 8/1940 | David | |
| 3,527,301 A | 9/1970 | Raifsnider | |
| 4,348,243 A | 9/1982 | Craubner | |
| 5,657,822 A * | 8/1997 | James et al. | 166/292 |
| 6,561,732 B1 | 5/2003 | Bloomfield et al. | |
| 6,581,682 B1 * | 6/2003 | Parent et al. | 166/180 |
| 6,672,385 B2 | 1/2004 | Kilaas et al. | |
| 7,413,022 B2 * | 8/2008 | Broome et al. | 166/386 |
| 7,464,752 B2 * | 12/2008 | Dale et al. | 166/227 |
| 7,493,947 B2 | 2/2009 | Ross | |
| 7,637,320 B2 | 12/2009 | Howard et al. | |
| 7,673,678 B2 | 3/2010 | MacDougall et al. | |
| 7,942,206 B2 | 5/2011 | Huang et al. | |
| 2005/0199401 A1 * | 9/2005 | Patel et al. | 166/387 |
| 2007/0044963 A1 * | 3/2007 | MacDougall | 166/278 |
| 2007/0246212 A1 * | 10/2007 | Richards | 166/227 |
| 2009/0183873 A1 * | 7/2009 | Bunnell et al. | 166/278 |
| 2010/0038086 A1 * | 2/2010 | Bunnell et al. | 166/300 |
| 2010/0126735 A1 * | 5/2010 | Allison et al. | 166/387 |
| 2010/0132944 A1 | 6/2010 | Li et al. | |
| 2010/0200233 A1 * | 8/2010 | Yeh et al. | 166/276 |
| 2011/0079384 A1 | 4/2011 | Russell et al. | |

FOREIGN PATENT DOCUMENTS

WO      2009051881 A1     4/2009

OTHER PUBLICATIONS

PCT Notification of Transmittal of the International Search Report and the Written Opinion of the International Searching Authority, or the Declaration; dated Jun. 18, 2013; International Application No. PCT/US2012/046900; International Filing Date: Jul. 16, 2012.

* cited by examiner

*Primary Examiner* — Blake Michener
(74) *Attorney, Agent, or Firm* — Bracewell & Giuliani LLP; Constance G. Rhebergen; James M. Sellers

(57) ABSTRACT

An apparatus for controlling water ingress into a pipe useful in the production of hydrocarbons from underground reservoirs comprises a multi-layer tubular, the multi-layered tubular comprising an outer pipe layer, an inner pipe layer longitudinally aligned within the outer pipe layer, and a hydrophilic composite material between the outer pipe layer and the inner pipe layer. The composite comprises a material selected from the group consisting of sand, silt and clay and mixtures thereof. The composite material is non chemically reactive and has absorption properties such that the material swells in the presence of water but is non-absorptive of hydrocarbons. Upon exposure to water, composite material creates an impervious shield covering at least a portion of the inner pipe layer.

12 Claims, 3 Drawing Sheets

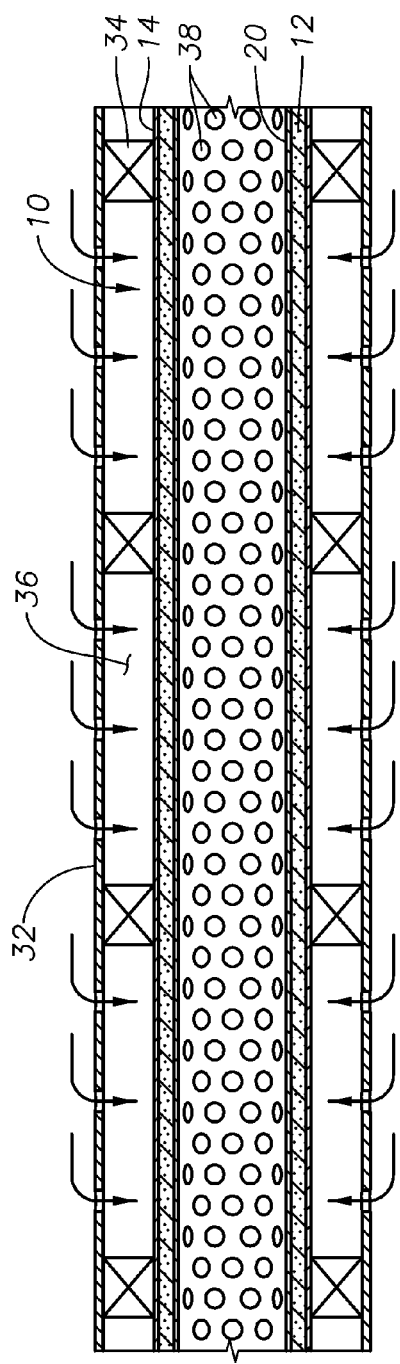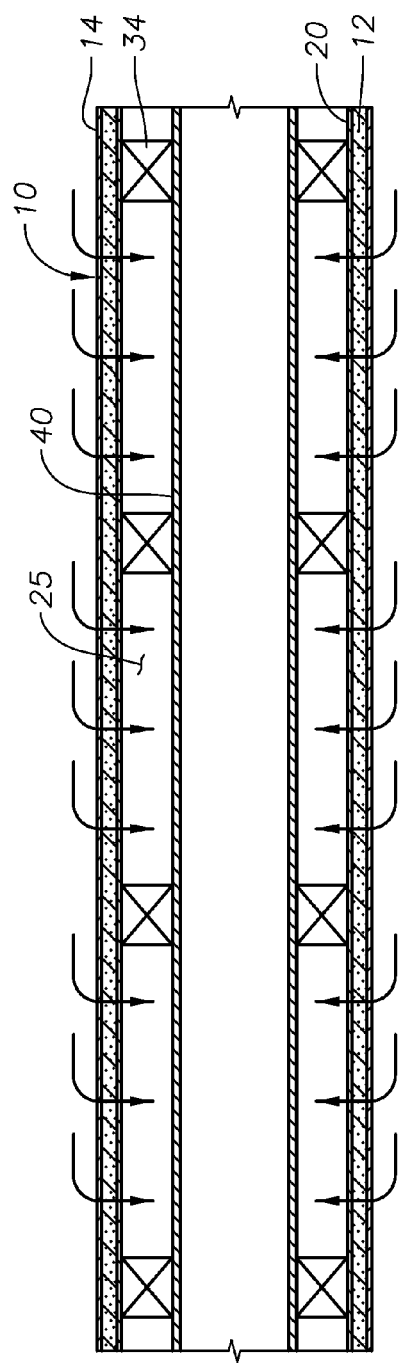

WATER SELF-SHUTOFF TUBULAR

BACKGROUND OF THE INVENTION

1. Field of the Invention

The present invention relates to controlling the production of oil and gas reservoirs. More specifically, the invention relates to an apparatus and method for controlling water production with a multi-layered tubular with a water sensitive composite.

2. Description of the Related Art

Casing leaks in oil and gas producing wells are a constant concern throughout the industry. Casing leaks may be caused by, among other things, corrosion, pitting and cracking due to acidic or caustic water from the formation or reservoir. Wear from running the casing into the well, particularly for deviated wells, can lead to weak points that are even more susceptible to leaking caused by corrosive water from the formation. Casing leaks may allow high pressure fluids and gasses and unwanted chemicals to enter the annulus and in extreme cases, can lead to underground blowouts. In addition, casing leaks can allow produced hydrocarbons and other well fluids to escape from the casing into the environment. Current practices for dealing with casing leaks commonly include installing a liner inside of the leaking casing, which reduces the interior diameter of the tubing as a completion. This in turn potentially limits the production and the services (such as maintenance) of the wellbore.

Another issue facing oil and gas well producers is the management and control of water production. When oil and gas producing wells are in operation, formation water also naturally migrates towards a producing wellbore. Ingress of water into the wellbore will increase the cost of production because the water will then have to be separated from the oil and gas at the surface. Additionally, it will reduce the volume of oil and gas being produced. A common current practice for controlling water production is byusing inflow control devices, both passive and active, for smart well completion. However these methodologies are expensive in terms of initial costs as well as in terms of time and costs spent on maintenance and repairs.

Therefore there is a need to find a more efficient and cost effective solution for these issues.

SUMMARY OF THE INVENTION

Embodiments of the current application address the issues of both casing leaks and water production and are valid and viable solutions for long term planning of oil and gas developments. Embodiments of this application include a multi-layered tubular, such as one that would be used for casings or tubings, that has the capabilities to either be completely impervious to water or alternatively to shutoff water with the early entry of water production while maintaining permeabilities similar or higher than reservoir permeability with oil production. This concept should be able to work with vertical, horizontal and complex wells, such as multi-laterals.

Additional benefits of the embodiments of the present application are that they provide maintenance free and easier to operate solutions than current prior art. Most of the manufacturing of the tubular is completed in a more controlled environment at the surface, customized to meet specific well conditions. And in providing a venue for cost savings in addition to improving recovery of hydrocarbons, it uses easily obtainable, natural soil resources which are in abundance, such as local sands and clays.

In one embodiment of the present application, an apparatus for controlling water ingress into a pipe useful in the production of hydrocarbons from underground reservoirs comprises a multi-layer tubular, the multi-layered tubular comprising an outer pipe layer, an inner pipe layer longitudinally aligned within the outer pipe layer, and a hydrophilic composite material between the outer pipe layer and the inner pipe layer. The composite comprises a material selected from the group consisting of sand, silt and clay and mixtures thereof. The composite material is non chemically reactive and has absorption properties such that the material swells in the presence of water but is non-absorptive of hydrocarbons, and such that upon exposure to water, is operative to create an impervious shield covering at least a portion of the inner pipe layer.

In alternative embodiments, the inner pipe layer and outer pipe layer are solid walled members. In other embodiments, the composite material has an initial permeability equal to or higher than a permeability an oil and gas reservoir. The outer pipe layer and inner pipe layer may comprise holes through which hydrocarbons may flow. A perforated casing may surround the multi-layered tubular and the multi-layered tubular may transport production fluids. Alternatively, a production tubing may be located within the multi-layered tubular.

In alternative embodiments, the composite further comprises shaped particles. The shape of the shaped particles may be hexagons, octagons, crosses or stars.

In other alternative embodiments, a method for controlling water ingress into a pipe useful in the production of hydrocarbons from underground reservoirs, comprises the steps of (a) providing a multi-layer tubular, the multi-layered tubular comprising an outer pipe layer and an inner pipe layer longitudinally aligned within the outer pipe layer; (b) selecting a composite material from the group consisting of sand, silt and clay and mixtures thereof, the composite material being non chemically reactive, the composite material having absorption properties such that the material swells in the presence of water but is non-absorptive of hydrocarbons, and such that upon exposure to water, the composite material is operative to create an impervious shield covering at least a portion of the inner pipe layer; (c) adding the composite material to a space between the outer pipe layer and the inner pipe layer; and (d) positioning the multi-layer tubular within the well.

In alternative embodiments the step of adding the composite material is performed by a method selected from the group consisting of dipping, bathing, dumping, packing and pre-forming. In some embodiments, the inner pipe layer and outer pipe layer are solid walled members and step (b) further comprises selecting a composite material that is completely impervious to water when the multi-layer tubular is positioned within the well. In other embodiments, the outer pipe layer and inner pipe layer may comprise holes through which a fluid may flow and step (b) may include selecting a composite material that has an initial permeability equal to or higher than a permeability of an oil and gas reservoir.

In other embodiments, step (d) further comprises positioning the multi-layered tubular inside of a perforated casing in the well and transporting production fluids within the multi-layered tubular. Alternatively, step (d) further comprises positioning a production tubing within the multi-layered tubular.

In some embodiments, step (b) further comprises selecting a composite with shaped particles. The shape of the shaped particles may be hexagons, octagons, crosses or stars.

BRIEF DESCRIPTION OF THE DRAWINGS

So that the manner in which the above-recited features, aspects and advantages of the invention, as well as others that will become apparent, are attained and can be understood in detail, a more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

FIG. 3 is a section view of an embodiment of the tubular of FIG. 1.

FIG. 4 is a section view of another embodiment of the tubular of FIG. 1.

DETAILED DESCRIPTION OF THE EXEMPLARY EMBODIMENTS

Figure 1:
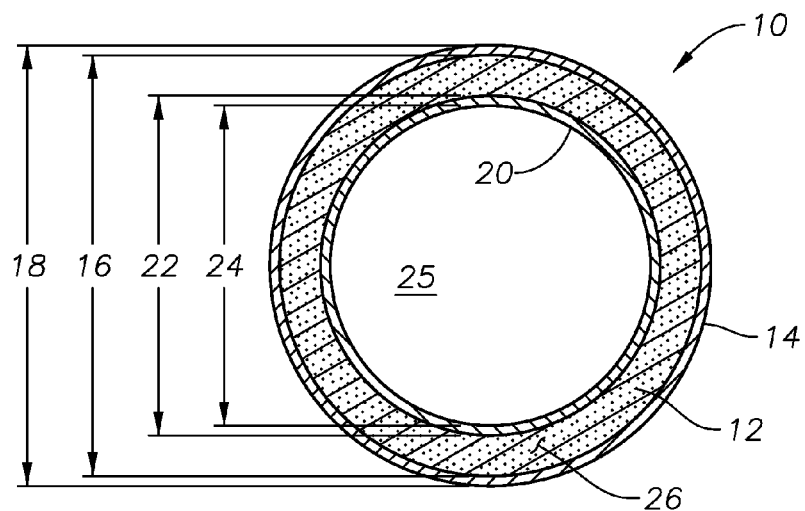
FIG. 1 is a section view of the tubular of the embodiments of the present application.

Turning to FIG. 1, the multi-layered tubular 10 of the embodiments of the current application is fabricated using the concept of multi-layered (plain, solid, slotted or holed) carbon steel tubulars. The tubular 10 has an internal composite 12 of specialized sediments that contains water sensitive composite materials, such as soil constituents including sand, silt or clay or a combination of sand, silt and clay, that will eliminate or reduce the permeability of composite 12 significantly due to the production of reservoir water and yet maintains permeability as good as the reservoir or higher with hydrocarbon production.

Multi-layered tubular 10 comprises an outer pipe layer 14 with an inner diameter 16 and an outer diameter 18. Inner pipe layer 20 has an outer diameter 22 and an inner diameter 24. Inner diameter 16 of outer pipe layer 14 is larger than outer diameter 22 of inner pipe layer 20, creating an annulus 26 therebetween. Internal composite 12 is located within annulus 26. Within inner diameter 24 of inner pipe layer 20 is central chamber 25. The well operations, including production and maintenance, may take place within central chamber 25. In some embodiments, production will occur within central chamber 25 itself and in other embodiments, tubing may be installed within central chamber 25 to carry the produced fluids to the surface.

Tubular 10 is a pre-fabricated member and may be manufactured at a an off-site facility before being shipped to the well location where it is to be used. Tubular 10 is sized, in terms of overall length of each segment and in diameters 16, 18, 22, 24 for optimized cost and production considerations, prior to being installed. For example, the determination of the size of annulus 26, and thus the thickness of composite 12, for effective control of water production depends on several factors. These factors include but are not limited to water salinity range and composite 12 permeability changes. The effective thickness factor can be determined experimentally or theoretically, for example, by analogy to the formulation of effective pipe insulation R-values.

Internal composite 12 is comprised of water sensitive composites such as sand, silt, clay, or any other material that are water sensitive, to be located within annulus 26 of tubular 10. Tubular 10 may be manufactured by applying composite 12 to an external surface of inner pipe layer 20 or an internal surface of outer pipe layer 14 through a dipping or bathing process. Alternatively, composite 12 may be in bead or other particle form and dumped or packed into annulus 26. In other embodiments, composite 12 may be preformed by casting or other methods. Other alternative methods of locating composite 12 within annulus 26 may also be used. As is further discussed below, in some applications, composite 12 will comprise a mix of readily available local sands, silts and clays, specifically mixed and tailored to the reservoir properties and purposes of the particular application. Composite 12 may absorb water, but does not undergo a chemical reaction with water. Composite 12 is hydrophilic and therefore while it is capable of absorbing water, it does not absorb, or swell from contact with, the produced hydrocarbons.

Figures 2A, 2B:
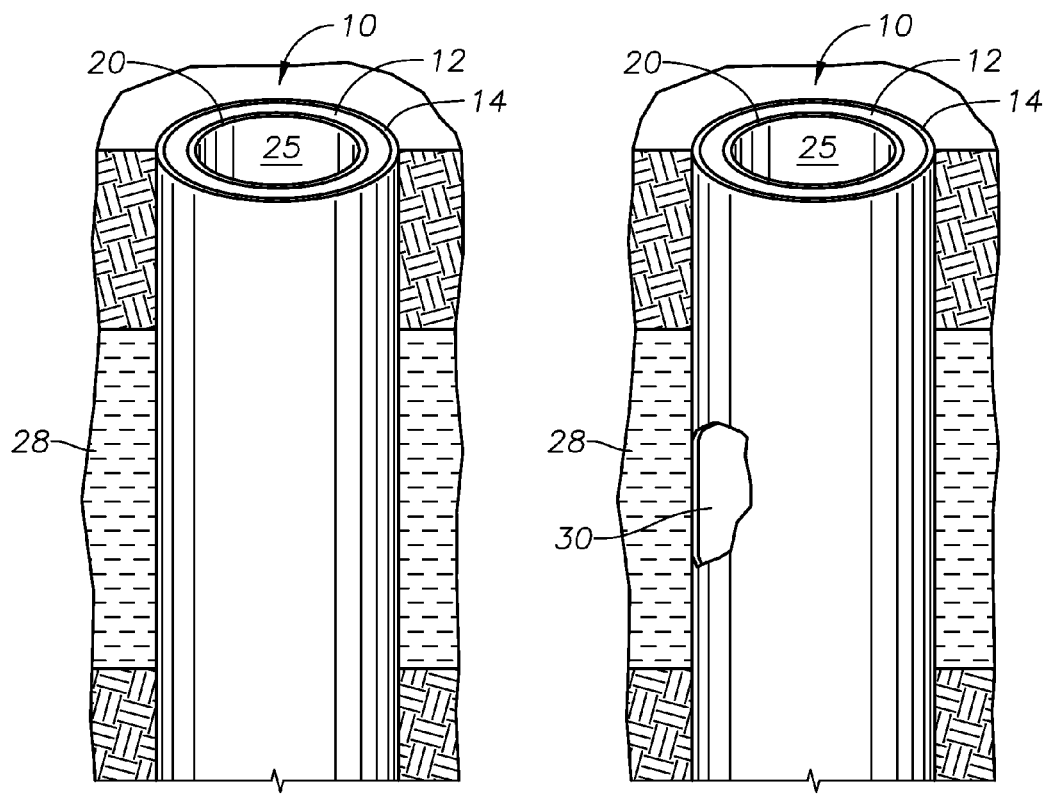
FIG. 2a is perspective view of an embodiment of the tubular of FIG. 1.
FIG. 2b is another perspective view of an embodiment of the tubular of FIG. 1.

Turning to FIG. 2a, in one embodiment of the current application, tubular 10 is a casing situated within a zone containing a layer of corrosive water 28. Both outer pipe layer 14 and inner pipe layer 20 are solid walled members—that is, they do not have any openings such as perforations, holes or slots. Outer pipe layer 14 is exposed to corrosive water 28 and for a period of time after installation, outer pipe layer 14 is able to maintain a barrier against corrosive water 28. However, over time, as can be seen in FIG. 2b, corrosive water 28 acts to deteriorate outer pipe layer 14 until a breach 30 is formed in outer pipe layer 14. Corrosive water 28 is then able to penetrate outer pipe layer 14 and come into contact with internal composite 12.

In this embodiment, internal composite 12 will be either a solid, substantially solid, or become substantially solid upon contact with fluids, such that its permeability will block the corrosive water 28 from further penetrating within tubular 10. Internal composite 12 will also have the property of being extremely resistant to corrosive water; that is, corrosive water 28 will not cause deterioration of internal composite 12. The action of composite 12 blocking the corrosive water 28 will take place without any operator observation or action required. Therefore, although corrosive water 28 has been able to penetrate the outer pipe layer 14 of tubular 10, composite 12 has created an impervious barriers so that the corrosive water 28 has not compromised the functionally of tubular 10 nor affected the production or other operations occurring within central chamber 25. This will minimize the cost of maintenance, and avoid potential losses of oil gas that could escape outward from the central chamber 25. In addition, this solution avoids the application of casings liners which are commonly used to address casing leaks. The use of a casing liner would reduce the size of central chamber 25, thereby affecting the operations that take place within chamber 25.

In an alternative embodiment of FIG. 3, tubular 10 is a production tubing located within a perforated casing 32. A flow space 36 is created between an inner surface of casing 32 and an outer surface of tubular 10. Packers 34 are spaced intermittently within space 36, blocking the flow of fluids along space 36. Oil, gas, water and other production fluids may pass through casing 32, which has been perforated by traditional means. Tubular 10 has mechanical slotted or holed doors 38 in both the outer pipe layer 14 and inner pipe layer 20. These holes or slots 38 can be exposed by hydraulic or mechanical means, allowing for hydrocarbons to pass through the wall of tubular 10 and into central chamber 25 (FIG. 1) without significant pressure drop.

If, during production, water enters flow space 36 through casing 32 and migrates though the holes in outer pipe layer 14, it will come into contact with composite 12. Composite 12 will react by swelling and thereby reducing its permeability and becoming impervious to water. This reaction will take place based on the properties of composite 12 itself, without any operator observation or action required.

Therefore, little to no water will enter central chamber 25 (FIG. 1) of tubular 10. This will assist in maintaining the quality of the produced fluids and eliminate the need for inflow control devices. In this embodiment, composite 12 will be developed or selected such that it has a starting permeability as good as reservoir permeability or higher and have swelling characteristics that cause it to eliminate water ingress based on the reservoir criteria such as the salinities of the formation water or the range of the salinities of the produced water.

Another alternative embodiment is shown in FIG. 4, where tubular 10 acts as a production casing. In this embodiment, central chamber 25 (FIG. 1) may contain production tubing 40 and various packers 34 located between the production tubing 40 and tubular 10. In other embodiments, the produced fluids flow directly within central chamber 25 an no production tubing 40 or packers 34 are used.

Both the outer pipe layer 14 and inner pipe layer 20 of tubular 10 in this embodiment are perforated. If, during production, water reaches tubular 10 and comes into contact with composite 12. Composite 12 will react by swelling and thereby reducing its permeability and becoming impervious to water. This reaction will take place based on the properties of composite 12 itself, without any operator observation or action required. Therefore, little to no water will enter central chamber 25 (FIG. 1) of tubular 10. Because no water enters through tubular 10, if production tubing 40 is used, no water will enter production tubing 40. This will assist in maintaining the quality of the produced fluids and eliminate the need for inflow control devices.

In order to protect the integrity of composite 12 within tubular 10, specialized drilling fluid, such as oil based drilling fluids, and cementation methodologies will be used. Composite 12 will be designed such that the drilling and cementation process will not affect its future function. In this embodiment, composite 12 will be developed or selected such that it has a starting permeability as good as reservoir permeability or higher and have swelling characteristics that cause it to eliminate water ingress based on the reservoir criteria such as the salinities of the formation water or the range of the salinities of the produced water.

Several types of composites 12 will be required in the embodiments discussed herein, depending on the intended functions for the particular application. In some embodiments, what is known to occur in nature can be reverse engineered to develop a cost effective and successful composite 12, tailored to fit a particular purpose. As has been discovered, the productivity of oil and gas wells depends, among other things, upon the effective permeability of reservoir sands to those fluids. A decrease in the permeability of sands will decrease the overall rate of oil, gas and water production. Prior to drilling, most reservoir sands contain both interstitial waters and clay minerals. The existence of the interstitial water means that the clays are hydrated to a certain degree and are in swelling equilibrium with the water at the time of discovery of the oil and gas fields. When wells are drilled for the production of oil, some water will infiltrate into the sand from the drilling mud. This introduced water will cause swelling of the clay particles, thereby partly blocking the capillary openings in the sand and reducing the size of the paths that the hydrocarbons can flow through to the well bore, thereby reducing the rate of flow of hydrocarbons to the well bore. The problem becomes even more severe when water is injected into the sands to obtain additional hydrocarbons from nearly depleted fields.

Reservoir sands that are particularly susceptible to damage by exposure to waters are termed water sensitive. One laboratory method widely used as a qualitative indication of the water sensitivity of sand is determination of the difference in permeability of rock samples when dry and when saturated with waters of various chemical compositions. Different clays exhibit varying capacity to change volume when wetted with water. The change of volume depends, to some extent, upon the chemical composition of the water. Such factors as the type of clay present, the salinity of the introduced water, and the water sensitivity of the sand will affect the change in permeability.

In nature, sands containing kaolins, illites, and mixed-layer clay (illite-montmorillonite) have been found to be the most sensitive to water, and the sand containing only small amounts of kaolins and illites was the least sensitive. The sand that contained the most kaolins and illites are intermediate in water sensitivity. Knowing this, the very sands and clays that affect the rate of production can be put to positive use by selecting and combining them to form composite 12 to meet the specific needs of the embodiments described herein.

Figure 5A:
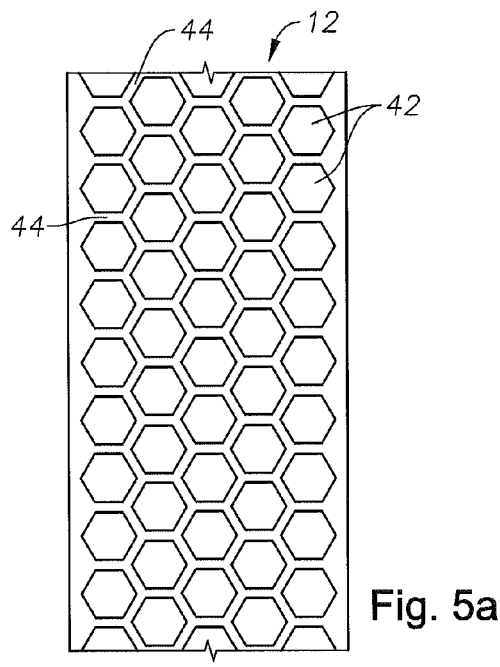
FIG. 5a is a view of a composite used in an embodiment of the tubular of FIG. 1.
Figure 5B:
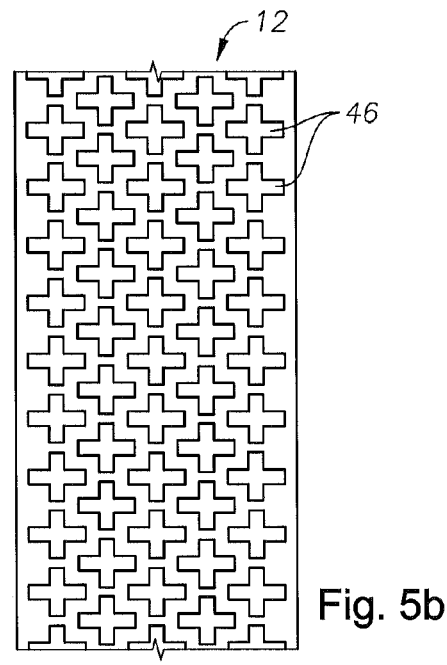
FIG. 5b is a view of an alternative composite used in an embodiment of the tubular of FIG. 1.
Figure 5C:
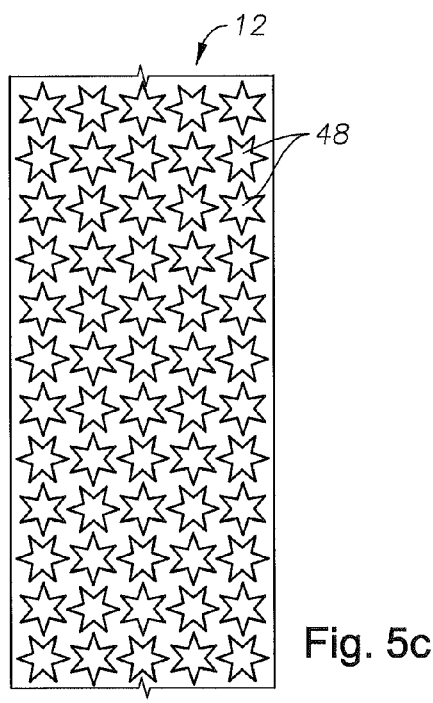
FIG. 5c is a view of another alternative composite used in an embodiment of the tubular of FIG. 1.
Figure 5D:
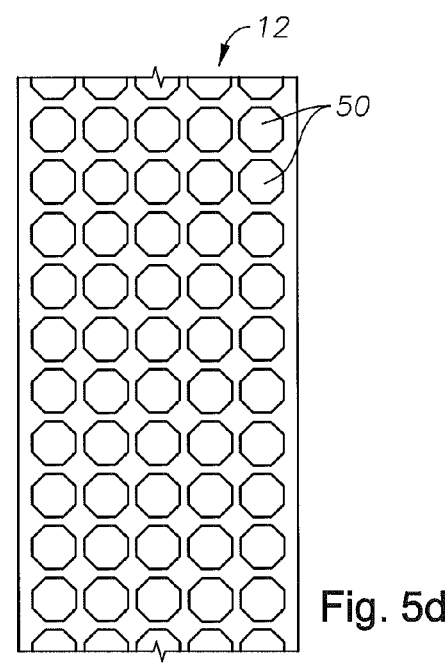
FIG. 5d is a view of another alternative composite used in an embodiment of the tubular of FIG. 1.

The composite may be also a fabricated material under specialized lab work. Looking at FIGS. 5a-5d, in alternative embodiments, composites 12 may include specially shaped components. For example, composite 12 may include components of hexagonal cross-sectional shape grains 42 with channels 44 for fluid flow, as seen in FIG. 5a. Alternatively, the components may be octagonal or other multifaceted shapes and the length of the sides of each of the shapes may be equal to each other or may vary. The channels 44 may be coated with clay, allowing the tortuosity of the fluid pathways to be controlled and yet when the clay swells, the permeability can be effectively reduced or eliminated. In other alternative embodiments, the new composite structures may instead be formed of cross cross-sectional shaped grains 46 as show in FIG. 5b, or formed of star cross-sectional shaped grains 48 as shown in FIG. 5c, or formed of octagon cross-sectional shaped grains 50 as shown in FIG. 5d.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise. Optional or optionally means that the subsequently described event or circumstances may or may not occur. The description includes instances where the event or circumstance occurs and instances where it does not occur. Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. An apparatus for producing hydrocarbons from an oil and gas reservoir that is operable to control water ingress comprising:
   a multi-layer tubular, the multi-layered tubular comprising:
   an outer pipe layer,
   an inner pipe layer longitudinally aligned within the outer pipe layer, and
   a hydrophilic composite material between the outer pipe layer and the inner pipe layer,
   wherein the hydrophilic composite material is selected from the group consisting of sand, silt and clay and mixtures thereof, the composite material is non chemically reactive, the composite material has absorption properties such that the composite material swells in the presence of water but is non-absorptive of hydrocarbons, the composite material formed into shaped particles having a cross-sectional shape selected from a group consisting of hexagon, octagon, cross and star, and such that upon exposure to water the composite material is operative to swell to create an impervious shield covering at least a portion of the inner pipe layer.

2. The apparatus of claim 1, wherein the inner pipe layer and outer pipe layer are solid walled members.

3. The apparatus of claim 1, wherein the composite material has an initial permeability equal to or higher than a permeability of the oil and gas reservoir.

4. The apparatus of claim 3, wherein the outer pipe layer and inner pipe layer comprise holes through which hydrocarbons may flow.

5. A method for producing hydrocarbons from an oil and gas reservoir for while controlling water ingress, comprising the steps of:
   (a) providing a multi-layer tubular, the multi-layered tubular comprising an outer pipe layer and an inner pipe layer longitudinally aligned within the outer pipe layer;
   (b) selecting a hydrophilic composite material from the group consisting of sand, silt and clay and mixtures thereof, the composite material is non chemically reactive, the composite material has absorption properties such that the material swells in the presence of water but is non-absorptive of hydrocarbons, the composite material formed into shaped particles having a cross-sectional shape selected from a group consisting of hexagon, octagon, cross and star, and such that upon exposure to water the composite material is operative to swell to create an impervious shield covering at least a portion of the inner pipe layer;
   (c) adding the composite material to a space between the outer pipe layer and the inner pipe layer; and
   (d) positioning the multi-layer tubular within an oil and gas producing well in contact with the oil and gas reservoir.

6. The method of claim 5, wherein the step of adding the composite material is performed by pre-forming.

7. The method of claim 5, wherein the inner pipe layer and outer pipe layer are solid walled members and wherein step (b) further comprises selecting a composite material that is completely impervious to water when the multi-layer tubular is positioned within the well.

8. The method of claim 5, wherein the outer pipe layer and inner pipe layer comprise holes through which a fluid may flow and wherein step (b) further comprises selecting a composite material that has an initial permeability equal to or higher than a permeability of the oil and gas reservoir.

9. The method of claim 5, wherein step (d) further comprises positioning the multi-layered tubular inside of a perforated casing in the well and transporting hydrocarbons within the multi-layered tubular.

10. The method of claim 5, wherein step (d) further comprises positioning a production tubing within the multi-layered tubular.

11. A system for producing hydrocarbons from an oil and gas reservoir that is operable to control water ingress comprising:
   a. The apparatus of claim 3, and
   b. a perforated casing surrounding the apparatus of claim 3, where the apparatus of claim 3 is operable to transport hydrocarbons.

12. The system of claim 11, further comprising a production tubing located within the apparatus of claim 3.

* * * * *